July 2, 1957 L. K. NEHER 2,798,165
STABLE PHOTOMULTIPLIER AMPLIFIER
Filed April 12, 1956
*Fig. 3*
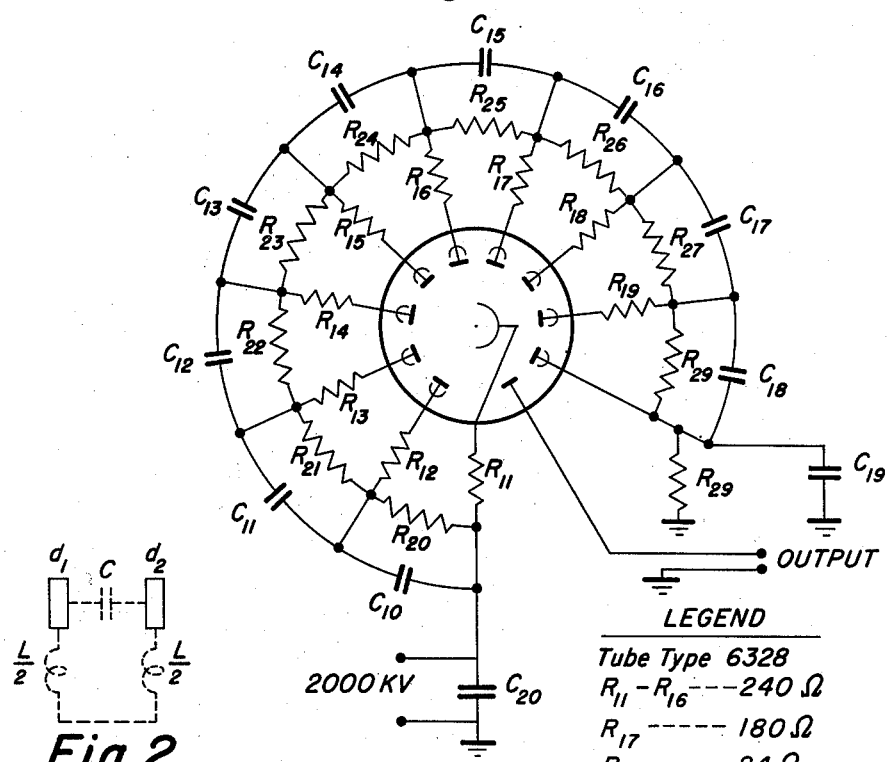
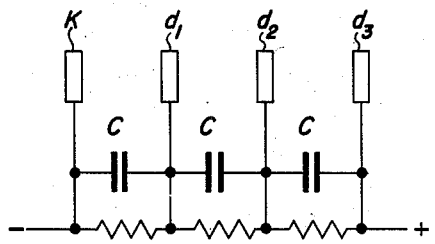
*Fig. 2*
*Fig. 1*
LEGEND
Tube Type 6328
$R_{11} - R_{16}$ --- 240 Ω
$R_{17}$ ----- 180 Ω
$R_{18}$ ----- 24 Ω
$R_{19}$ ----- 212 Ω
$R_{20} - R_{24}$ --- 62 kΩ
$R_{25}$ ----- 100 kΩ
$R_{26}$ ----- 120 Ω
$R_{27}$ ----- 280 Ω
$R_{28}$ ----- 540 kΩ
$R_{29}$ ----- 680 Ω
$C_{10} - C_{16}$ --- 0.001 µfd
$C_{17} - C_{20}$ --- 0.01 µfd
$C_{18}$ ----- 0.1 µfd
$C_{19}$ ----- 1.0 µfd
WITNESSES:
Henry Heyman
INVENTOR.
Leland K. Neher
BY
Roland A. Anderson
Attorney

United States Patent Office 2,798,165
Patented July 2, 1957

2,798,165

STABLE PHOTOMULTIPLIER AMPLIFIER

Leland K. Neher, Los Alamos, N. Mex., assignor to the United States of America as represented by the United States Atomic Energy Commission Application April 12, 1956, Serial No. 577,905

3 Claims. (Cl. 250—207)

This invention relates to photoelectric circuits and more particularly to photomultiplier tube circuits for use in the measurement of light intensities of transient steep wave front nature.

Prior art devices for the measurement of light intensities utilizing photomultiplier circuits have been found to be practical and reliable for many applications. However, it has been found that if the light intensity has a high magnitude increase of substantially vertical rise, the photomultiplier circuit may be shock excited into complex oscillatory conditions with the result that it is unable to respond linearly to the increase in light intensity.

It is a primary purpose of the present invention to provide circuitry in association with a photomultiplier tube such as to eliminate any tendency to self oscillation and to establish the conditions which result in linear behavior. This and other objects and advantages will become apparent from the following specification and drawing made a part thereof.

In the drawing:

Figure 1 is a schematic circuit of a portion of a photomultiplier tube circuit of the prior art useful in explaining the principles of the present invention;

Figure 2 is a schematic equivalent of a pair of dynodes of Figure 1; and

Figure 3 is a practical embodiment of the present invention.

It has been found that the application of the usual photomultiplier circuit such as shown, for example, on page 186 of the Handbook of Industrial Electronic Circuits by Marcus Zeluff, published by McGraw-Hill Book Company, is not feasible for the measurement of exceedingly rapid high magnitude changes in light intensity such as that created by nuclear explosions, spark discharges in air, and other phenomena.

The explanation of the phenomena giving rise to oscillatory conditions is best explained with reference to the showings of Figures 1 and 2 wherein the cathode K and a number of dynodes $d_1$, $d_2$, $d_3$, etc. and the associated circuitry are shown. It is seen that a high rate of change of current on a dynode results in a potential across the inductance of the lead to the dynode, and this potential is coupled to other dynodes by the capacitance existing between the dynodes. In view of the fact that the collector currents become progressively greater on the dynodes in the direction of the collector, it is apparent that each dynode of each adjacent pair of dynodes will be at different potentials due to different time rate change of currents. That is, if the inductance L of the connections to the dynodes is of the same value, then the transient potential on each dynode will be $$L\frac{di}{dt}$$

In a photomultiplier tube $$\frac{di}{dt}$$

becomes progressively greater on each dynode leading to the collector. Consequently, the transient potential difference between any two dynodes is $$L\left(\frac{di}{dt^2} - \frac{di}{dt^1}\right)$$

where $$\frac{di}{dt^2}$$

is the time rate change of current on the dynode which is closer to the collector and $$\frac{di}{dt^1}$$

is the time rate change of current on any preceding dynode. However, the difference in transient or modulated potential on adjacent dynodes appears to be most deleterious to linear behavior because of the readily oscillatory nature of the loop established by the capacitance between the dynodes of the pair and the inductance of the lead-in conductors to the dynodes of the pair.

The ends of the lead-in conductors remote from the dynodes are connected to the casual voltage divider $r_1$, $r_2$, $r_3$, etc. and to the usual storage capacitors $C_1$, $C_2$, $C_3$, etc. The storage capacitors have negligible reactance at transient frequencies and can be neglected. Consequently with respect to high frequency excitation the lead-in conductors can be considered as connected together at the ends remote from the dynodes.

Referring to Figure 2, an equivalent circuit of the dynodes $d_1$ and $d_2$ of Figure 1 is shown. The mutual capacitance between the dynodes is shown by dotted lines and indicated by the letter C. The inductances in the leads are shown by dotted lines and each is indicated to have a value L/2. The mutual capacitance and the connecting lead inductances provide a high frequency closed oscillatory circuit having a resonant frequency equal to $$\frac{1}{2\pi\sqrt{LC}}$$

This oscillatory circuit is readily excited by the difference in potential generated by the different time rate increases in current in the two adjacent dynodes across their respective equally inductive lead-in conductors.

From circuit theory, it is known that if a closed series circuit having an inductance L in series with a capacitance C is provided with a series resistor R of value equal to $2\sqrt{L/C}$, it is unable to sustain an oscillatory condition. That is, any transient current decays to zero in an approximately exponential fashion.

Figure 3 shows a practical embodiment of a photomultiplier circuit containing the novel features of the present invention.

The value of $2\sqrt{L/C}$ for each pair of dynodes is determined by direct measurement of the inductance of the lead-in connections to the respective tube electrodes and the capacitance between adjacent dynodes. The value of $2\sqrt{L/C}$ for the type 6328 photomultiplier tube, with its base plugged into a conventional socket, has a value closely approximating 480 ohms. The connections to the cathode and the next succeeding five dynodes are provided with resistors of one half critical value, i. e., 240 ohms, so that the resistance in series with the loop is the critical value of 480 ohms. The five pairs of electrodes are so stabilized by the utilization of resistances of critical value in the loop circuits that the value of resistances connected in series with the later dynodes can be compromised downward from the critical value. It is necessary under very severe operating conditions to utilize series resistors of lower value than the critical value in the later multiplier stages to avoid excessive voltage drops across the resistors. For example, if the peak dynode current of a later dynode is 2 amperes, the drop across a resistor of critical value would be 480 volts. This value of modulating potential detracts from the linearity of behavior of the circuit even tho, due to the presence of critical damping in other dynode circuits, the modulating potential is unable to initiate an oscillatory condition. Accordingly, as long as the principles of this invention are applied to a sufficient number of the early, and therefore most sensitive, stages of a photomultiplier circuit, deviations in value of the damping resistors in later stages can be tolerated.

The foregoing description of the practical embodiment of Figure 3 is not intended to limit the nature of this invention. It is understood that the spirit of this invention resides in the discovery that the utilization of resistors of critical damping value in series with any pair of dynodes in a photomultiplier tube results in completely stabilizing the circuit associated with that pair of dynodes. Consequently there are various arrangements in circuitry utilizing a photomultiplier tube wherein the invention may be applied. Accordingly, it is the intention to limit the scope of this invention only by the appended claims taken in connection with the prior art.

What is claimed is:

1. A photomultiplier circuit for operation under highly transient light intensities comprising a photomultiplier tube having at least a pair of dynodes and conductors electrically connected thereto, a resistor directly connected in series with the conductor of each dynode having a value equal to $\sqrt{L/C}$ where C is the capacitance between the dynodes and L is a sum of the inductances of the conductors.

2. A stabilized photomultiplier circuit for operation under highly transient light intensities comprising a photomultiplier tube having a cathode electrode, a plurality of dynode electrodes and a collector electrode, a voltage divider having a plurality of tap connections, one each for each of said cathode and dynode electrodes, a conductor including a resistor connecting each of said divider taps to a respective electrode, said resistor having a value equal to $\sqrt{L/C}$ where L is twice the inductance of each said conductor and C is the capacitance between each electrode and an adjacent electrode, and a capacitor connected between each adjacent pair of divider taps.

3. A photomultiplier circuit for operation under highly transient light intensities comprising a photomultiplier tube having at least a photo-cathode electrode and a plurality of dynode electrodes; lead-in conductors connected to each of said electrodes, a damping resistor having the value $\sqrt{L/C}$, where L is twice the inductance of each lead-in conductor and C is the capacitance between each pair of adjacent electrodes, connected directly to the free end of the lead-in conductors, a voltage divider resistor having a connection to the free end of each damping resistor, a source of potential connected across the voltage divider resistor, and a capacitor connected between each adjacent pair of voltage divider connections.

References Cited in the file of this patent

UNITED STATES PATENTS

| | | |
|---|---|---|
| 2,594,703 | Wouters | Apr. 29, 1952 |
| 2,754,452 | Onksen | July 10, 1956 |